United States Patent [19]

Green

[11] 4,033,098

[45] July 5, 1977

[54] GRASS TRIMMING APPARATUS

[76] Inventor: Garry J. Green, Corydon, Iowa 50060

[22] Filed: May 30, 1975

[21] Appl. No.: 582,172

[52] U.S. Cl. .................................. 56/17.5; 30/276; 56/295; 56/DIG. 18
[51] Int. Cl.² .................................................. A01D 55/18
[58] Field of Search ............... 56/17.5, 255, 12.7, 56/256, DIG. 18, 295; 30/276

[56] References Cited

UNITED STATES PATENTS

| 498,533 | 5/1893 | Clousing | 56/255 |
|---|---|---|---|
| 1,238,595 | 8/1917 | Sundholm | 56/255 X |
| 2,970,419 | 2/1961 | Lieberman | 56/17.5 |
| 3,859,776 | 1/1975 | Ballas | 56/12.7 |

FOREIGN PATENTS OR APPLICATIONS

| 887,163 | 1/1962 | United Kingdom | 56/DIG. 18 |

*Primary Examiner*—Jay N. Eskovitz
*Attorney, Agent, or Firm*—Rudolph L. Lowell

[57] ABSTRACT

The grass trimming apparatus includes an elongated frame structure having a front base portion and a rear handle portion, a single ground engaging wheel adjacent the rear end of the base portion, and a motor and cutter unit assembly on the forward end of the base portion. The lower portion of the motor and cutter unit assembly is located within the transverse confines of the base portion so that only flexible cutting elements on the cutter unit extend laterally outwardly from below the base portion during a grass trimming operation. The frame structure is longitudinally and laterally tiltable on the single wheel support and at least one hand grip on the handle portion of the frame structure is adjustably movable to a position within the transverse confines of the frame structure to provide for a maximum efficiency of the apparatus in trimming lawn adjacent wall structures, headstones, fences and the like.

4 Claims, 5 Drawing Figures

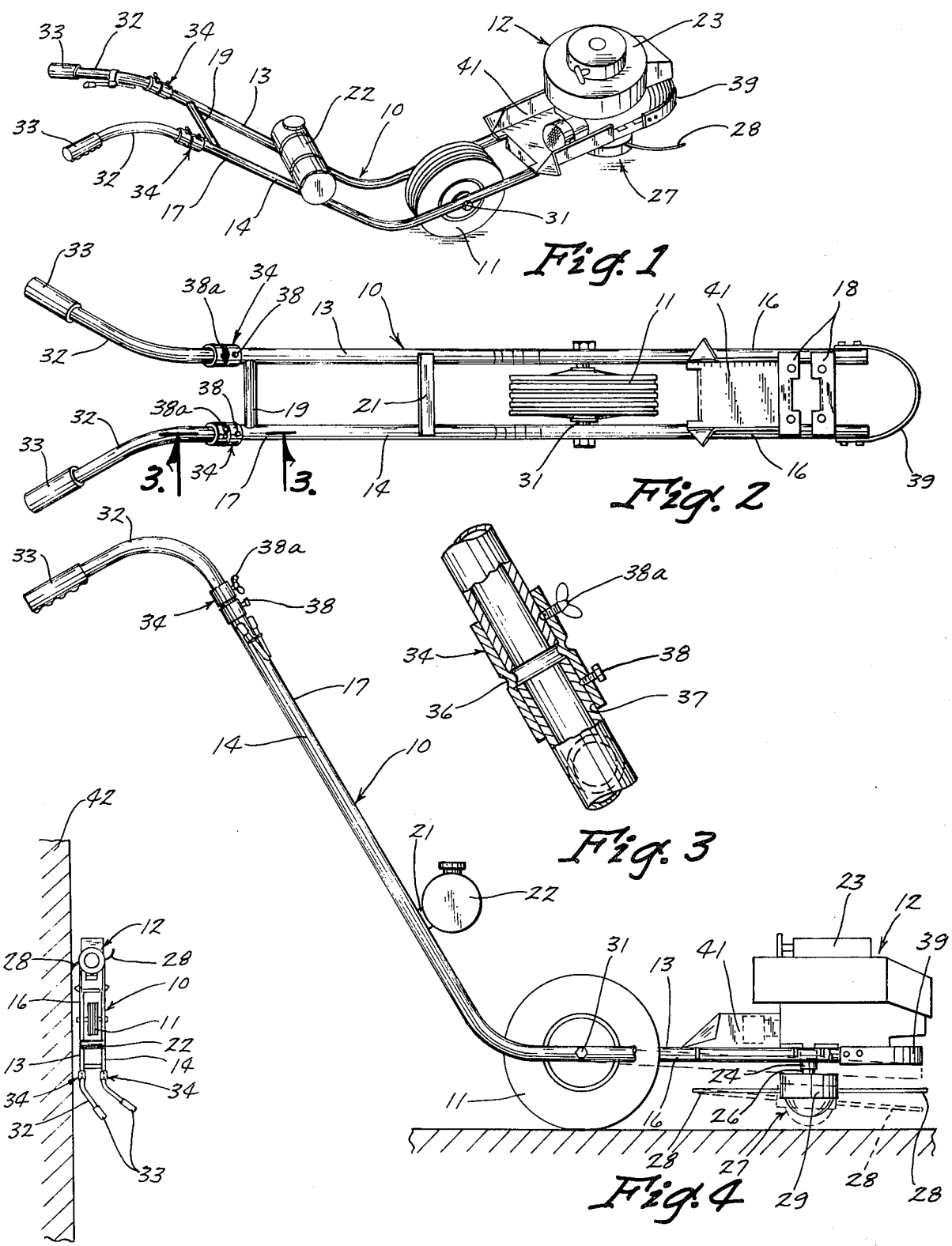

GRASS TRIMMING APPARATUS

SUMMARY OF THE INVENTION

The grass trimming apparatus is economical in cost, efficient in operation to cleanly trim grass around wall structures, headstones and trees without defacement or injury, and is of a light weight construction for easy handling and manipulation by one man with a minimum of effort. The motor and cutter unit assembly is carried substantially within the dimensional confines of the elongated frame structure and adjacent the forward end of the structure so that only the flexible cutting elements project outside of such dimensional confines during a cutting operation. By virture of the frame structure being longitudinally and laterally tiltable on the ground wheel, cutting may take place forwardly of, or to one side of, the front end of the frame structure so that the apparatus is capable of trimming grass within confined areas or of edging lawns along side walks and the like.

BRIEF DESCRIPTION OF THE DRAWINGS

FIG. 1 is a perspective view of the grass trimming apparatus of this invention;

FIG. 2 is an enlarged top plan of the apparatus in FIG. 1 with parts removed to show the portable frame structure of the apparatus;

FIG. 3 is an enlarged sectional view taken on line 3—3 in FIG. 2;

FIG. 4 is an enlarged side elevational view of the apparatus shown in FIG. 1; and FIG. 5 is a schemmatic view showing the use of the apparatus in trimming grass along one side of a wall structure.

DETAILED DESCRIPTION OF THE INVENTION

With reference to FIG. 1 of the drawings, the grass trimming apparatus of this invention is illustrated as including a portable elongated frame structure 10 having a single ground wheel 11. A motor and cutter unit assembly 12 is mounted at the front end of the frame structure 10 at a position forwardly of the ground wheel 11.

The frame structure 10 (FIGS. 2 and 4) is comprised of a pair of transversely spaced side members 13 and 14 of a tubular construction, each of which is integrally formed with a horizontal front base section 16 and an upwardly and rearwardly extended handle section 17. The front base sections 16 are connected together adjacent their front ends by a pair of transverse longitudinally spaced mounting plates 18 which support the motor and cutter assembly 12. The rear handle sections 17 are connnected together adjacent their upper ends by a tubular connecting member 19. A support member 21 for a gas tank 22 connects the handle sections intermediate the ends thereof.

The motor and cutter unit assembly 12 includes an engine 23 (FIG. 4) having a vertically arranged shaft 24 operatively connected to a drive shaft 26 of a cutting unit 27. The engine 23 is supported on the mounting plates 18 so as to be located above the base sections 16 of the frame side members 13 and 14. The cutting unit 27 suspends from the engine shaft 24 so as to be positioned below the side members 13 and 14. The cutting unit 27 includes flexible cutting elements 28 of a nylon cord material which is wound on spools (not shown) stored within a housing 29 of the cutting unit. The nylon cord is yieldably unwound from a spool to provide for the extension of the cutting elements 28 radially outwardly from the housing 29. When a cutting element 28 becomes worn it is manually replaced by unwinding the cord from within the housing 29. The engine 23 is of a usual gas engine type and for a more detailed description of the cutting unit 27, reference is made to U.S. Pat. No. 3,826,068.

The ground wheel 11 is positioned between the side members 13 and 14 rearwardly of the motor and cutter unit assembly 12 and adjacent the rear ends of the front base sections 16 (FIGS. 2 and 4). It is seen, therefore, that the ground wheel is arranged substantially at the junction of the front base sections with the rear handle sections 17. The ground wheel is rotatably supported on a transverse axle or shaft 31 that extends between and is carried on the front base sections 16.

Each handle section 17 terminates in a handle member 32 of a tubular construction and provided at one end with a hand grip 33. The other end of each handle member 32 is connected to the upper end of a corresponding handle section 17 by a tubular sleeve or coupling member 34 of a size to telescopically receive within the ends thereof an adjacent handle member 32 and handle section 17. The telescopic reception of a handle member and a handle section within a coupling connector 34 is limited by an annular shoulder 36 projected inwardly of the connector bore 37 (FIG. 3) intermediate the ends of the coupling 34. Locking or friction screws 38, one of which is illustrated as a wing screw 38a, secure a handle member 32 in an adjusted position relative to a corresponding handle section 17. In this respect it is to be noted that on release of a wing screw 38a a handle member 32 is adjustably rotatable relative to the longitudinal axis of a handle section 17. The handle members 32 are normally adjusted so as to be in a diverged relation outwardly and downwardly from the upper ends of the handle sections 17.

In one embodiment of the invention the frame structure 10 is about five and three-quarter inches wide with each side member 13 and 14 formed of a seven-eighths inch O.D. tubular material and having a base section about two feet long and a handle section two and one-half feet long. The motor or engine 23 is a three horsepower Tecumseh manufactured by Lawson Power Products and of dimensions providing for the complete engine except the flywheel housing as its upper end, being within the transverse confines of the frame structure 10. The housing 29 of the cutter unit 27 is also of a size to fit within the transverse confines of the frame structure so that during the operation of the grass trimming apparatus only the flexible cutting elements 28 project laterally outwardly from the frame structure, usually a distance of about nine inches.

In this embodiment of the invention, the ground wheel 11 has a diameter of about ten inches and projects downwardly from the base sections 16 a distance of about one inch below the bottom side of the housing 29 of the cutter unit 27. As best appears in FIG. 4, the bottom side of the housing 29 is of an inverted dome shape so as to eliminate any scarifying of the ground surface on contact of the cutter unit 27 therewith.

In the use of the invention, the frame structure 10 is tilted forwardly on the wheel axle 31, as shown in dash lines in FIG. 4, to provide for a forward and downward inclination of the base sections 16. As a result of the longitudinal tilting action, the cutting zone of the cutting elements 28 is at the forward end of the frame structure 10. To protect the engine 23 and to prevent injury or defacement to objects around which grass is being trimmed the frame struture is equipped with a front bumper 39 of an arcuate shape (FIGS. 2 and 4) the ends of which are connected to the forward ends of the base sections 16.

Although the nylon construction of the cutting elements 28 substantially eliminates the hazard of propelling objects struck thereby toward the operator or to any individuals in the work area, a flat horizontal shield 41 is connected between the base sections 16 rearwardly of the mounting plates 18 to prevent cut grass or like material from being thrown against the operator.

The engine 23, as illustrated in FIGS. 1 and 5, rotates in a clockwise direction when viewed from the position of the operator. Thus, in trimming grass along the base of a brick wall or the like, indicated at 42 in FIG. 5, it is desirable that the left side of the frame structure 10, as viewed from the position of the operator, be located adjacent the wall structure. This manner of operation is one of convenience since it will prevent the cut grass from being thrown toward the operator. Additionally, since the handle members 32 are normally in a rearwardly diverged relation, the handle member 32 for the frame side member 13 is rotatably adjusted so as to be positioned inwardly of such side member 13 whereby to permit a travel of the frame structure in a position closely adjacent to the wall structure 42. This adjustment of the handle member on the side member 13 provides for the frame structure 10 being laterally tiltable on the ground wheel 11 to locate the cutting zone of the elements 28 at the side of the frame structure adjacent the wall structure 42. A close grass trimming operation is thus obtained. It will be apparent that a lateral tilting of the frame structure will also provide for the cutting elements functioning to trim lawns along sidewalks and driveways.

Because of the elongated frame structure and its relatively narrow width, the apparatus is easily manipulated within confined areas to efficiently trim grass adjacent the base portions of headstones, trees, shrubs and the like, without any danger of defacing or injuring the same. For this reason the apparatus is particularly adapted for grass trimming operations in cemeteries and the like.

Although the invention has been described with respect to a preferred embodiment thereof, it is to be understood that it is not to be so limited since changes and modifications can be made therein within the full intended scope of the invention as defined by the appended claims.

I claim:
1. A grass trimming apparatus comprising
 a. an elongated frame structure including a pair of transversely opposite longitudinally extended side members each of which includes a forward horizontal base section, and an upwardly and rearwardly inclined rear section terminating in a downwardly and rearwardly inclined handle member,
 b. a first transverse member connecting together the rear sections of said members,
 c. a motor,
 d. a motor support means comprising a pair of longitudinally spaced mounting plates secured to said forward horizontal base section and extending within the confines of said forward horizontal base section,
 e. a single ground engaging wheel arranged between said base section adjacent the rear ends thereof,
 f. a transverse axle for said ground wheel carried on said base section,
 g. said motor and a cutter unit mounted on said support means said motor and cutter unit located within the transverse confines of said forward horizontal base section
 h. flexible cutting elements on said cutter unit extendible laterally outwardly from said forward horizontal base section on rotation of said cutter unit, said forward horizontal base section longitudinally tiltable about said transverse axle to move the cutting zone of said cutting elements to a first position such position being closer to the material being cut and laterally tiltable with said ground engaging wheel to move the cutting zone of said cutting elements to a second position to one side of the frame structure,
 i. a front bumper member having the ends thereof secured to the forward ends of said horizontal base section and projected forwardly thereof to form a protective guard for the lower forward side of said motor, and,
 j. means for adjustably supporting at least one of said handle members on a rear section corresponding thereto for rotational movement relative to the longitudinal axis of said corresponding rear section to adjusted positions extended laterally from from either one or the other of the sides of said rear section.

2. The grass trimming apparatus of claim 1 wherein:
 a. said ground engaging wheel projects downwardly from said base sections a distance greater than the downward projection of said cutting unit from said base sections to provide for said base sections being inclined forwardly and downwardly during a cutting operation.

3. The grass trimming apparatus of claim 1 wherein:
 a. said frame structure has a width of about six inches and said ground wheel a diameter of about ten inches.

4. The structure recited in claim 1 wherein a second transverse member extends between the said first transverse member and said forward horizontal base section, and, a fuel container mounted on said second transverse member for supplying fuel to the said motor unit.

* * * * *